Patented Dec. 23, 1952

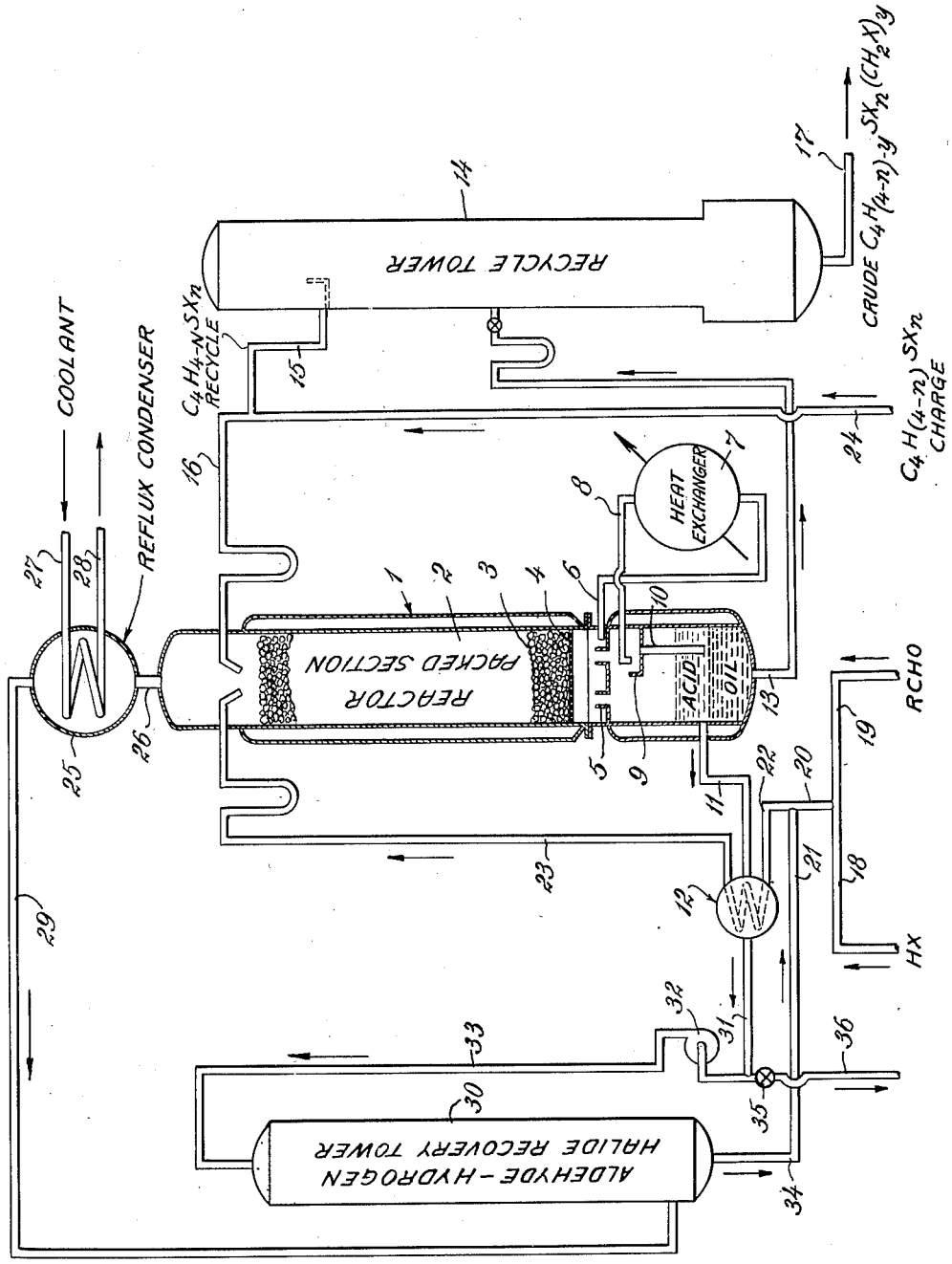

2,623,049

UNITED STATES PATENT OFFICE 2,623,049

PREPARATION OF HALOTHENYL HALIDES

Henry D. Norris, Woodbury, N. J., assignor to Socony-Vacuum Oil Company, Incorporated, a corporation of New York Application March 18, 1947, Serial No. 735,338

17 Claims. (Cl. 260—332.5)

1

The present invention relates to the preparation of halothenyl halides and, more particularly, to the preparation of halothenyl chlorides.

The haloalkylation of aromatic compounds was first described by Grassi and Masselloin 1898. These investigators prepared benzyl chloride from benzene, formaldehyde and hydrogen chloride in the presence of zinc chloride. In a discussion of the replacement of a hydrogen atom by a halomethyl group in a single operation, Fuson and McKeever ["Organic Reactions" Ed. Roger Adams (John Wiley & Sons, Inc.) (1942)] at page 64 et seq. make several statements of interest. These authorities state:

". . . chloromethylation is generally applicable to aromatic compounds. Benzene, naphthalene, anthracene, phenanthrene, biphenyl and many of their derivatives have been converted to chloromethyl derivatives. Terphenyl, however, resists chloromethylation altogether . . . The presence of a halogen atom on the ring causes the reaction to be more difficult to effect. Although such compounds as bromo- and chlorobenzene, bromo- and chlorotoluenes, and p-dichlorobenzene can be chloromethylated, the yields are frequently low. More highly halogenated derivatives generally fail to undergo chloromethylation . . . The most important side reaction is that leading to the formation of the corresponding diarylmethane derivative. Highly reactive compounds of many sorts—naphthalene, anisole, phenols, polymethylbenzenes, etc.—tend to yield this type of product, and it is often difficult or impossible to isolate the intermediate chloromethyl derivative."

In view of the statements of these authorities that "halogenated derivatives generally fail to undergo chloromethylation" and that highly reactive aromatic compounds yield diarylmethane derivatives, it is surprising to discover that halothiophenes yield halomethyl derivatives in good yields and not the corresponding dithienyl methane derivative.

It is an object of the present invention to provide a method for haloalkylating halogenated thiophenes. It is another object of the present invention to provide a method for preparing haloalkyl halothiophenes in a single step from halothiophenes. It is a further object of the present invention to provide haloalkylhalothiophenes. Other objects and advantages will become apparent from the following description.

A study of the literature of the preparation of haloalkylhaloaromatic compounds by haloalkylating haloaromatic compounds leads to the conclusion that rather vigorous conditions are required. That is to say, the single step method for preparing haloalkyl haloaromatic compounds has required the use of a dehydrating catalyst such as zinc chloride, phosphoric acid, sulfuric acid or zinc chloride-aluminum chloride, water-free paraformaldehyde and gaseous hydrogen chloride.

Blanc; Bull. Soc. Chem., (4) 33, 313 (1923).
Vavon; ibid, (5) 6, 1025 (1939).
Fieser; J. Am. Chem. Soc., 57, 942 (1935).
Smith; ibid, 62, 1349 (1940).
Bruce and Kahn; ibid, 60, 1017 (1938).
Stephen, Short and Gladding; J. Chem. Soc. 117, 510 (1920).
Horn and Warren; ibid, 1946, 144.
Tschunkur & Eichler; D. R. P. 509, 149; C. A., 25, 711 (1931).
Chem. Zentr. 102, 1, 360 (1931).

In other words, the free water content of the reaction mixture was maintained at the lowest concentration compatible with experimental conditions. In contrast, the haloalkylation of halothiophenes can be carried out using an aldehyde, such as aqueous formaldehyde and aqueous hydrogen halide.

It is to be noted that Blicke and Burkhalter in 1942 reported the preparation of chloromethylthiophene in 38–40 per cent yields in the Journal of the American Chemical Society. These investigators prepared chloromethylthiophene

or α-thienylmethyl chloride by chloromethylation of thiophene. These investigators were able to convert 40 per cent of the thiophene to α-thienylmethyl chloride and 38 per cent to di-α-thienylmethane

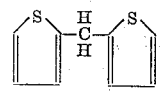

by treating a mixture of thiophene, concentrated hydrochloric acid and formaldehyde with a rapid stream of hydrogen chloride. That is to say, these investigators found it necessary to employ rather severe conditions in order to chloromethylate thiophene in 40 per cent yields. It will also be noted that an equivalent amount of thiophene was converted to the dithienylmethane derivative.

Steinkopf states that Biederman reported in Berichte Deutsche Chemische Gesellschaft 19, 639, 1620 (1886) the preparation of 2-thenylchloride,

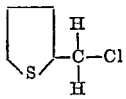

from 2-thenylalcohol,

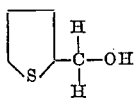

and hydrogen chloride. Steinkopf reported in Liebigs Annalen die Chemie 513, 281 (1934) that by direct bromination of 2-methylthiophene a mixture of 3-bromo-2-methylthiophene and 5-bromomethylthiophene is obtained as well as the almost symmetrical 3,5 - dibromo - 2-methylthiophene. Further bromination led to the production of 3,4,5 - tribromo - 2 - methylthiophene. In this preparation, however, one must be cautious since it is readily attacked in the side chain and according to the conditions converted into 3,4,5-tribromo-2-thenylbromide

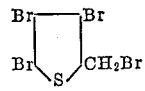

or into 3,4,5-tribromo-2-thenylbromide

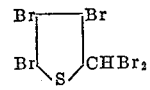

Thus, it is apparent that the single step direct production of halo-2-thenylhalides has not been reported. Furthermore, if support is given to the view that thiophene reacts in a manner similar to benzene, it is surprising that halo-2-thenylhalides can be produced in good yields by a single step direct reaction under mild conditions.

Broadly stated, the present invention provides a means for producing mono-, di- and tri-, chloro- or bromothenyl halides which correspond broadly to the formula

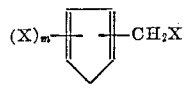

where X is iodine, bromine or chlorine and $m$ is 1 to 3. Thus, for example, 2-chlorothiophene,

can be converted into 5-chloro-2-thenylchloride,

2,5-dibromothiophene,

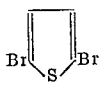

can be converted into 2,5-dibromo-3-thenylchloride,

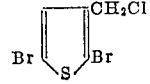

2,3,5-trichlorothiophene,

can be converted into 2,4,5-trichloro-3-thenylchloride,

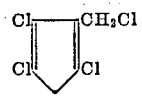

and the same or similar compounds can be converted into the thenyl bromides in a single step direct operation. In a corresponding manner, homologs corresponding to the formula

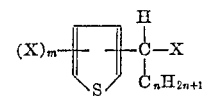

where X is iodine, bromine or chlorine, $m$ is 1 to 3 and $n$ is 1 to 4, and corresponding to the formula

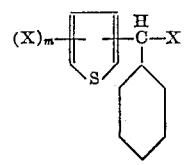

where X is iodine, bromine or chlorine and $m$ is 1 to 3, can be prepared using alicyclic, heterocyclic and aromatic aldehydes.

Illustrative of the foregoing are the following non-limiting examples.

EXAMPLE I (5-chloro-2-thenylchloride)

In a discontinuous operation, 5 - chloro - 2-thenylchloride can be produced in a single step direct reaction from 2-chlorothiophene in the following manner. Concentrated hydrochloric acid and 2-chlorothiophene are placed in a container provided with a stirrer, a reflux condenser, a discharge port, means for heating and cooling the reaction mixture and similar conventional auxiliary equipment. The hydrogen chloride and the 2-chlorothiophene are used in a ratio of about 7.04 moles of hydrogen chloride to about 1 mole of 2-chlorothiophene (boiling point 122–130 degrees centigrade). To the well stirred mixture of 2-chlorothiophene and hydrochloric acid about 1.85 moles of an aqueous solution of formaldehyde having a concentration of 36 to 38 per cent, and generally known in industry as "Formalin" solution, is added. The reaction temperature rises spontaneously and is maintained at about 40 degrees centigrade usually without the application of additional heat. After two hours' stirring at 40 degrees centigrade, the temperature of the reaction is raised to 60 degrees centigrade, and maintained at that temperature whilst agitating the reaction mixture for an additional two hours. The reaction is then stopped by quenching, for example, in water employing, preferably, about two volumes of water for each volume of reaction mixture. The quenched mixture is then extracted with petroleum ether or other suitable solvent for the oily reaction product, and the extract thoroughly washed with water until neutral. The washed extract is separated from the wash water in any suitable manner and dried in any desired manner, for example, with anhydrous sodium sulfate. The extract is then separated from the drying agent and the solvent removed, for example, on a steam bath. A distillation of the crude product provided the following two distillates and a still residue:

| Cut | Temp., °C. | Pressure, mm. Hg | Percent weight of still charge | Percent yield based on reacted chlorothiophene |
|---|---|---|---|---|
| I. B. P | 86 | 20 | | |
| 1 | 90 | 20 | 23.2 | 17 |
| 2 | 100 | 20 | 65.2 | 50 |
| Residue | | | 11.6 | |

It is manifest that most of the distilled product is 5-chloro-2-thenyl chloride while unreacted chlorothiophene is removed on the steam bath.

A portion of each of cuts 1 and 2 were combined and reacted with potassium ethyl xanthate. The product obtained, i. e. 5-chloro-2-thenyl ethyl xanthate, was analyzed.

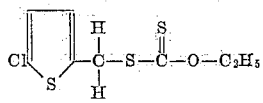

| | Calculated | Observed |
|---|---|---|
| $C_8H_9OS_3Cl$: | Percent | Percent |
| Cl | 14.1 | 14.1 |
| S | 38.0 | 37.7 |

EXAMPLE II

(2,5-dibromo-3-thenylchloride)

Concentrated hydrochloric acid, aqueous 37 per cent formaldehyde and 2,5-dibromothiophene are mixed in the molal proportion of about 2.42 moles of formaldehyde and about 17.6 moles of hydrogen chloride per mole of 2,5-dibromothiophene. The reaction mixture is heated to about 80 degrees centigrade with agitation for about 6 hours. Thereafter, the reaction mixture is cooled to about 50 degrees centigrade and the oily lower layer of reaction product separated from the aqueous upper layer. The product is dried, say, with sodium carbonate or in any other suitable manner and the dried crude product distilled under reduced pressure. The following is a log of the distillation of a portion of the dried product.

| Cut No. | Temp., °C. | Pressure, mm. Hg | Percent weight of still charge | $N_D^{20}$ |
|---|---|---|---|---|
| I. B. P | 60 | 4 | | |
| 1 | 73 | 4 | 4.0 | 1.6157 |
| 2 | 79 | 3 | 8.0 | 1.6196 |
| 3 | 85 | 3 | 6.1 | 1.6188 |
| 4 | 100 | 3 | 6.1 | 1.6154 |
| 5 | 105 | 3 | 13.1 | 1.6220 |
| 6 | 110 | 3 | 14.2 | 1.6300 |
| 7 | 113 | 3 | 16.2 | 1.6293 |
| 8 | 126 | 3 | 10.6 | 1.6253 |
| 9 | 140 | 3 | 10.6 | 1.6254 |
| Residue | | | 11.1 | |
| | | | 100.0 | |

Cut 6 gave 1.830 grams of silver halide per gram of compound. The theoretical yield of silver halide for 2,5-dibromo-3-thenyl chloride is 1.7864 grams.

2,5-dibromo-3-thenyl ethyl xanthate,

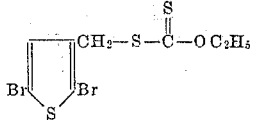

was prepared and analyzed.

| | Calculated | Observed |
|---|---|---|
| $C_8H_8S_3OBr_2$: S | Percent 25.5 | Percent 25.6 |

EXAMPLE III

(2,5-dichloro-3-thenyl chloride)

An aqueous solution of formaldehyde containing about 37 per cent formaldehyde, concentrated hydrochloric acid and 2,5-dichlorothiophene are mixed in the molal ratio of 1.8 moles of formaldehyde and 9.6 moles of hydrogen chloride per mole of 2,5-dichlorothiophene. The reaction mixture is heated with agitation to about 73 degrees centigrade for about 6 hours. Thereafter the reaction mixture is cooled and the organic layer separated from the aqueous layer. The oily organic layer is dried in any suitable manner, for example, with anhydrous magnesium sulfate and sodium carbonate. The oil is separated from the drying agent and distilled under reduced pressure. The log of the distillation is as follows:

| Cut No. | Temp., °C. | Pressure, mm. Hg | Percent weight of still charge | $N_D^{20}$ |
|---|---|---|---|---|
| I. B. P | 46 | 14 | | |
| 1 | 52 | 15 | 3.7 | 1.5621 |
| 2 | 60 | 15 | 19.0 | 1.5630 |
| 3 | 68 | 15 | 6.0 | 1.5661 |
| 4 | 80 | 15 | 2.2 | 1.5669 |
| 5 | 108 | 15 | 1.0 | 1.5730 |
| 6 | 109 | 15 | 2.5 | 1.5838 |
| 7 | 109 | 15 | 16.5 | 1.5846 |
| 8 | 110 | 15 | 17.5 | 1.5846 |
| 9 | 115 | 14 | 15.0 | 1.5844 |
| 10 | 124 | 5 | 2.2 | 1.5861 |
| 11 | 127 | 5 | 4.7 | 1.5929 |
| Residue | | | 3.0 | |
| Dry Ice trap | | | 6.7 | |
| | | | 100.0 | |

Material representative of cuts 6, 7, 8 and 9 and believed to be 2,5-dichloro-3-thenyl chloride, was analyzed for sulfur and chlorine.

| | Calculated | Observed |
|---|---|---|
| $C_5H_3SCl_3$: | Percent | Percent |
| Cl | 52.9 | 52.02 |
| S | 15.9 | 16.1 |

EXAMPLE IV

(2,4,5-trichloro-3-thenyl chloride)

2,3,5-trichlorothiophene, aqueous formaldehyde solution having a concentration of about 37 per cent formaldehyde and concentrated hydrochloric acid are mixed in the molal proportion of about 1.9 moles of formaldehyde and about 13.6 moles of hydrogen chloride for each mole of trichlorothiophene. The mixture is agitated for about 20 hours while maintaining a temperature of about 82 degrees centigrade, cooled and the organic layer separated. The material of the organic layer is dried in any suitable manner as, for example, with sodium carbonate and sodium sulfate and the dried product separated from the desiccant. The dried product is distilled under reduced pressure. A log of such a distillation is as follows:

| Cut No. | Temp., °C. | Pressure, mm. Hg | Percent weight of still charge | $N_D^{21}$ |
|---|---|---|---|---|
| I. B. P | 60 | 4 | | |
| 1 | 65 | 4 | 92.2 | 1.5788 |
| 2 | 100 | 4 | 1.7 | |
| 3 | 108 | 4 | 6.1 | 1.5964 |
| | | | 100.0 | |

Cut 1 is composed principally of 2,3,5-trichlorothiophene. Cut 3 is composed predominantly of 2,4,5-trichloro-3-thenylchloride,

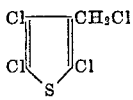

which when analyzed for chlorine gave the following value:

| | Calculated | Observed |
|---|---|---|
| | Percent | Percent |
| $C_5H_2SCl_4$: Cl | 60.1 | 58.6 |

In the foregoing examples the reaction between mono-, chloro-, dibromo-, dichloro-, and trichlorothiophenes, formaldehyde and hydrochloric acid has been described in detail. The corresponding iodine derivatives react in an analogous manner. That is to say, mono-, di- and triiodothiophene can be reacted with formaldehyde and hydrochloric acid in the same molal ratio as the corresponding chloro- and bromothiophene compounds to produce mono-, di- and triiodothenyl chloride. Furthermore, in precisely the same manner and employing the same molal proportions monochloro-, dichloro-, trichloro-, monobromo-, dibromo-, tribromo-, monoiodo-, diiodo- and triiodothenyl bromides, iodides and chlorides can be produced by the use of hydrobromic acid, hydriodic acid and hydrochloric acid, respectively, in conjunction with formaldehyde.

The length of the side chain of the halothiophene substituted alkyl halides or halothionyl halides can be varied by the use of aldehydes other than formaldehyde. For example, by the use of paraldehyde and one of the hydrogen halides, HCl, HBr or HI, a material corresponding to the formula

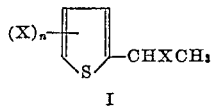

I where X is I, Br or Cl and $n$ is 1 to 3, can be obtained. Similarly, products corresponding to the formulas

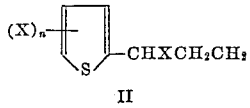

II and

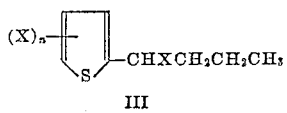

III where X is I, Br or Cl and $n$ is 1 to 3, can be obtained by using propaldehyde and butraldehyde and the desired hydrogen halide.

The foregoing discussion and description of specific nonlimiting illustrations of this embodiment of the invention establishes that the present invention provides a one step method for the preparation of halothiophene substituted alkyl halides or halothenyl halides from halothiophenes, using aliphatic aldehydes having 1 to 5 carbon atoms and hydrogen halides other than hydrogen fluoride. Consequently, when the term "halides" is used herein it excludes hydrogen fluoride as is general in a discussion of the reaction between compounds of carbon and the halides. In general, the reactants are used in such molal proportions as to provide an excess of the aldehyde and a large excess of hydrogen halide. Reaction temperatures above ambient temperature up to reflux temperature may be used. The time of reaction increases as the number of halogen substitution groups in the thiophene derivative increases and as the molecular weight of the aldehyde increases.

Although the preparation of halothenylhalides has been illustrated hereinbefore by discontinuous operation, the same materials can be prepared in an analogous manner in a continuous operation. Generally speaking, satisfactory results are obtained by reacting the liquid halogen substituted thiophene with vapors of an aldehyde and a halogen halide in the presence of highly porous absorptive material or solid adsorbent contact material as hereinafter defined. The reaction is carried out in such a manner that the halogen substituted thiophene is contacted in the presence of solid highly porous absorptive material with the vapors from a boiling mixture of an aldehyde and an aqueous hydrogen halide. This readily can be accomplished in the apparatus of the drawing.

The solid highly porous adsorptive material or solid adsorbent contact material preferably is in the form of porous masses providing multiplicity of passageways or a very large surface area. Although most satisfactory results are obtained employing solid highly porous adsorptive material or solid absorbent contact masses in the form of porous bodies presenting a relative large surface area of contact to the reactants in proportion to the volume, practical results can be obtained employing masses which are relatively inert as surface active material or as adsorbents.

Broadly stated, the preferred form of the continuous method for producing haloalkylated halogen substituted thiophene can be described as haloalkylating halogen substituted thiophene by co-current flowing of a stream of halogen substituted thiophene and a stream of aldehyde and liquid hydrogen halide countercurrent to a stream of vapors from a mixture of aldehyde and aqueous hydrogen halide. A simple form of the necessary equipment comprises a reboiler for aqueous aldehyde and hydrogen halide solution, a contact zone providing a tortuous path along which the liquid halogenated thiophene and liquid halide and hydrogen halide pass in countercurrent flow to the vapors of aldehyde and hydrogen halide, means for introducing fresh aldehyde and liquid hydrogen halide, means for introducing halogenated thiophene, means for removing spent halogen halide, means for removing reacted and unreacted halogenated thiophene, means for maintaining a predetermined temperature in the contact zone and a reflux condenser. Of course, suitable means for registering the temperature at various places in the apparatus are included.

The drawing is illustrative but not limiting, in a more or less diagrammatic manner of a unit for carrying out the continuous process of the present invention on an industrial scale.

A suitable means of providing a contact zone comprises a jacketed reactor 1 provided with a packed section 2. The packed section 2 of the reactor is provided with packing material 3 which may be in the form of glass beads, glass helices, Raschig rings, Fiberglas bats, pellets of natural or synthetic alumina silica gel, silica gel, wood charcoal or activated carbon such as coconut charcoal. The packing material 3 is maintained in place or rests on a suitable shelf or base such as perforated plate 4. Immediately beneath the reactor 1 is a bubble tray 5 from which the liquid draining from the packed section 2 is removed by line 6 to heat exchanger 7 wherein it is heated in any suitable manner to a temperature at which the hydrogen halide and aldehyde are volatile but not more than about 250 degrees Fahrenheit. The heated liquid is discharged from heat exchanger 7 through line 8 to tray 9 in the bottom of the reactor column. The volatile material in the heated liquid from the heat exchanger 7 volatilizes on tray 9 and passes up through the packed section. The non-volatile portion of the heated liquid from heat exchanger 7 passes to the bottom of the column through line 10. In the bottom of the column the non-volatile liquid separates into two phases: an aqueous phase and an oil phase. The aqueous phase is drawn off through line 11 and passed to heat exchanger 12. The oily portion of the liquid from the heat exchanger 7 is discharged from the bottom of column 1 through line 13. The material in line 13 passes to recycle tower 14 operated preferably at reduced pressure wherein the unreacted halogenated thiophene is taken as an overhead and recycled through lines 15 and 16 to the top of the packed section 2 of reactor 1. The crude haloalkylated halogenated thiophene is withdrawn from the recycle tower 14 through line 17 for purification in a suitable manner.

Aqueous hydrogen halide drawn from storage not shown through line 18 and aldehyde drawn from storage through line 19 are mixed in line 20 together with recovered aldehyde-hydrogen halide discharged into line 20 from line 21. The mixture of recovered aldehyde and hydrogen halide and fresh aldehyde and hydrogen halide in line 20 passes through line 22 to heat exchanger 12 where it absorbs heat from the acid solution from the base of reactor 1 and passes through line 23 to the top of packed section 2 of reactor 1. Fresh charge halogenated thiophene is drawn from storage and passed through line 24 to line 16 where mixed with recycle halogenated thiophene; the mixture is passed to the top of packed section 2 of reactor 1. Reactor 1 is provided with a reflux condenser 25 into which the fumes of hydrogen halide and volatile aldehyde are passed through line 26. Coolant passes into condenser 25 through line 27 and out through line 28. Uncondensed vapors from the reflux condenser 25 passed through line 29 to the aldehyde and hydrogen halide recovery tower 30. The aqueous liquid in the bottom of reactor 1 after passing through line 11 and heat exchanger 12 into line 31 is pumped by pump 32 through line 33 to the top of recovery tower 30 wherein it absorbs the vapors introduced into tower 30 through line 29. The fortified solution is drawn from the bottom of tower 30 through line 34 and mixed with fresh hydrogen halide and aldehyde in line 20. Valve 35 provides means for discharging aqueous liquid from the bottom of reactor 1 through line 36.

The preparation of halothenylhalide in a continuous manner may be carried out with the apparatus described hereinbefore in the following manner: for example, 2-chlorothiophene is drawn from storage through line 24 while simultaneously aqueous hydrogen halide and Formalin solution are drawn from storage through lines 18 and 19, respectively. The aqueous mixture of hydrogen halide and formaldehyde passes through line 20 and heat exchanger 12 through line 23 to the top of packed section 2 of reactor 1. A mixture of aqueous hydrogen halide and aqueous formaldehyde is heated in heat exchanger 7 in any suitable manner and discharged through line 8 to pan 9 where the hydrogen halide and formaldehyde volatilize and pass upward through packed section 2 of rector 1 in countercurrent flow to the liquid aqueous hydrogen halide and formaldehyde solution discharged from line 23 at the top of packed section 2 of reactor 1 and liquid 2-chlorothiophene discharged at the top of packed section 2 of reactor 1 from line 16. The liquid draining from packed section 2 of reactor 1 collects on pan 5 from which it is withdrawn through line 6 to heat exchanger 7. The non-volatile material draining from pan 9 through pipe 10 stratifies in the bottom of the reactor tower to form an aqueous layer and an oily layer. The aqueous layer is drawn off through line 11 and the oily layer is drawn off through line 13, from which it passes to recycle tower 14. In recycle tower 14 unreacted 2-chlorothiophene is taken as overhead through line 15 and mixed with fresh charge 2-chlorothiophene in line 24. The 5-chloro-2-thenylchloride formed in reactor 1 and removed therefrom through line 13 collects as a bottom product in recycle tower 14, from which it is withdrawn through line 17 for purification in any suitable manner, for example by fractionation. The vapors of water, hydrogen halide and aldehyde rising from packed section 2 of reactor 1 pass through line 26 into reflux condenser 25 wherein the vapors are cooled by a coolant such as water entering through line 27 and escaping through line 28. The non-condensable vapors escape from reflux condenser 25 and pass through line 29 to the bottom of the aldehyde, hydrogen halide recovery tower 30. Aqueous solution is withdrawn from the bottom of tower 1 through line 11, pass through heat exchange 12 into line 31 and drawn therefrom by pump 32 and passed through line 33 to the top of tower 30. Fortified aqueous solution containing the hydrogen halide and formaldehyde escaping from the reflux condenser 25 is then passed through lines 34 and 21 to line 20 wherein it mixes with fresh aqueous hydrogen halide and aqueous aldeyhde. The temperature of the reaction zone, i. e. packed section 2, in reactor 1 is maintained at about 210 degrees Fahrenheit by the heat transmitted to the reactor by the vapors from the vaporizer or heat exchanger 7.

While the hydrogen halide is generally employed in amounts in excess of theoretical proportions, the proportions in which the halogenated thiophene and the aldehyde are reacted will be dictated in a large measure by the economic factors controlling the choice. Either of these reactants may be used in excess of the theoretical proportion as required by the particular circumstances of a specific situation. Consequently, the molal ratio of hydrogenated thiophene to aldehyde may be varied from an excess of halogenated thiophene to an excess of aldehyde. In this relation those skilled in the art will understand that "any excess of a theoretical proportion" or "excess" is relative to the amount of each reactant as determined by the theoretical equation for the reaction which may be represented as follows:

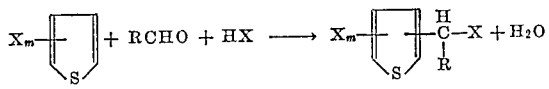

where

R is a hydrogen, an alkyl group, a benzene ring, an alkyl benzene ring or a heterocyclic ring, and X is chlorine, bromine or iodine.

I claim:

1. A method for preparing halothienyl methylhalides which comprises reacting essentially only a halothiophene having a replaceable nuclear hydrogen, formaldehyde and aqueous hydrogen halide.

2. A method for preparing halothienyl alkylhalides which comprises reacting essentially only a halothiophene having a replaceable nuclear hydrogen, an acyclic aldehyde having 1 to 5 carbon atoms and aqueous hydrogen halide.

3. A method for preparing compounds corresponding to the formula

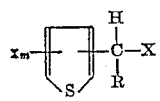

where R is hydrogen, a mononuclear aryl group, a cycloparaffin group, or an alkyl group having 1 to 5 carbon atoms and $m$ is 1 to 3 and X is chlorine, bromine or iodine which comprises reacting essentially only a halothiophene having a replaceable nuclear hydrogen with an aldehyde selected from the group consisting of single ring aromatic aldehydes, formyl cycloparaffins and acyclic aldehydes having 1 to 5 carbon atoms and aqueous hydrogen halide.

4. A method for preparing halothienyl methylhalides which comprises reacting essentially only a halothiophene having a replaceable nuclear hydrogen with formaldehyde and aqueous hydrogen halides at temperatures above 40 degrees centigrade to the reflux temperature.

5. A method for preparing compounds corresponding to the formula

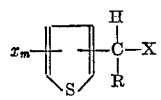

where R is hydrogen, a mononuclear aryl group, a cycloparaffin group, or an alkyl group having 1 to 5 carbon atoms, $m$ is 1 to 3 and X is chlorine, bromine or iodine which comprises reacting essentially only a halothiophene having a replaceable nuclear hydrogen, an aldehyde selected from the group consisting of acyclic aldehydes having 1 to 5 carbon atoms, formyl cycloparaffins and single ring aromatic aldehydes and aqueous hydrogen halide at elevated temperatures up to the reflux temperature.

6. A method for preparing monohalothienyl methylhalides which comprises reacting monohalothiophene having at least one replaceable nuclear hydrogen, formaldehyde and hydrogen halide at temperatures up to the reflux temperature.

7. A method for preparing dihalothienyl methylhalides which comprises reacting a dihalothiophene having at least one replaceable nuclear hydrogen, formaldehyde and hydrogen halide at temperatures up to reflux temperature.

8. A method for preparing trihalothienyl methylhalides which comprises reacting a trihalothiophene having a replaceable nuclear hydrogen, formaldehyde and hydrogen halide at temperatures up to reflux temperature.

9. A method for preparing compounds corresponding to the formula

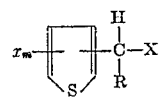

where R is hydrogen, a mononuclear aryl group, or an alkyl group having 1 to 5 carbon atoms, and X is chlorine, bromine or iodine, and $m$ is 1 which comprises reacting essentially only a monohalothiophene having at least one replaceable nuclear hydrogen with an aldehyde selected from the group consisting of acyclic aldehydes having 1 to 5 carbon atoms, formyl cycloparaffins and single ring aromatic aldehydes and aqueous hydrogen halide at temperatures up to reflux temperature.

10. A method for preparing compounds corresponding to the formula

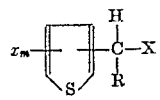

where R is hydrogen, a mononuclear aryl group, or an alkyl group having 1 to 5 carbon atoms, $m$ is 2 and X is chlorine, bromine or iodine which comprises reacting essentially only a dihalothiophene having at least one replaceable nuclear hydrogen, aqueous hydrogen halide and an aldehyde selected from the group consisting of acyclic aldehydes having 1 to 5 carbon atoms, formyl cycloparaffins and single ring aromatic aldehydes at temperatures up to reflux temperature.

11. A method for preparing compounds corresponding to the formula

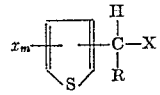

where R is hydrogen, a mononuclear aryl group, or an alkyl group having 1 to 5 carbon atoms, $m$ is 3 and X is chlorine, bromine or iodine which comprises reacting a trihalothiophene having a replaceable nuclear hydrogen, a hydrogen halide and an aldehyde selected from the group consisting of acyclic aldehydes having 1 to 5 carbon atoms, formyl cycloparaffins and single ring aromatic aldehydes at temperatures up to reflux temperature.

12. A method for preparing compounds corresponding to the formula

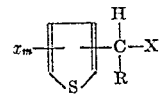

where R is hydrogen, a mononuclear aryl group, or an alkyl group having 1 to 5 carbon atoms, $m$ is 1 to 3 and X is chlorine, bromine or iodine which comprises intimately mixing halogenated thiophene having at least one replaceable nuclear hydrogen, hydrogen halide, and an aldehyde selected from the group consisting of acyclic aldehydes having 1 to 5 carbon atoms, formyl cycloparaffins and single ring aromatic aldehydes at the surface of highly porous adsorptive material.

13. A method for preparing compounds corresponding to the formula

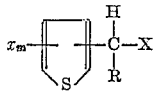

where R is hydrogen, a mononuclear aryl group, or an alkyl group having 1 to 5 carbon atoms, $m$ is 1 to 3 and X is chlorine, bromine or iodine which comprises flowing a stream containing liquid halogenated thiophene having at least one replaceable nuclear hydrogen through a tortuous path countercurrent to vapors of water, hydrogen halide and an aldehyde selected from the group consisting of acyclic aldehydes having 1 to 5 carbon atoms, formyl cycloparaffins and single ring aromatic aldehydes.

14. A method of preparing compounds corresponding to the formula

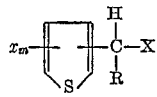

where R is hydrogen, a mononuclear aryl group, or an alkyl group having 1 to 5 carbon atoms, $m$ is 1 to 3 and X is chlorine, bromine or iodine which comprises introducing liquid halogenated thiophene having at least one replaceable nuclear hydrogen, hydrogen halide and an aldehyde into the upper part of a reaction zone containing solid absorbent contact material, introducing vapors of said aldehyde and hydrogen halide into the lower part of said reaction zone, and withdrawing liquid halogenated thiophene and one of the group halothenyl halide and alpha-substituted halothenyl halide from a point in said reaction zone below the source of said aldehyde and hydrogen halide vapors.

15. 5 - halothienyl - 2 - methylhalides having a composition corresponding to the formula

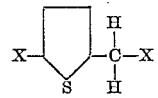

where X is a halogen selected from the group consisting of chlorine, bromine and iodine.

16. 5 - chloro - 2 - thenylchloride identified by forming with potassium ethyl xanthate a product containing 14.1 weight per cent chlorine and 38.0 weight per cent sulfur.

17. 5-chloro-2-thenyl chloride.

HENRY D. NORRIS.

REFERENCES CITED

The following references are of record in the file of this patent:

UNITED STATES PATENTS

| Number | Name | Date |
|---|---|---|
| 2,425,721 | Blicke | Aug. 19, 1947 |

OTHER REFERENCES

Organic Reactions, vol. I, pp. 64, 65, John Wiley and Sons, 1942.
Blicke: J. Am. Chem. Soc., 64, 478 (1942).
Blicke: J. Am. Chem. Soc., 68, 1934 (1946).
Steinkopf: Die Chemie des Thiophens, p. 45, Steinkopf, Dresden, 1941.
Steinkopf: Ann. 513, 284 (1934).